United States Patent [19]
Kajitani et al.

[11] Patent Number: 5,818,722
[45] Date of Patent: Oct. 6, 1998

[54] METHOD OF PLACING AND EXTRACTING MODULES

[75] Inventors: Yoji Kajitani, 22-28, Sakuradai, Aoba-ku, Yokohama-shi, Kanagawa-ken, 227; Kunihiro Fujiyoshi; Shigetoshi Nakatake, both of Ishikawa-ken; Hiroshi Murata, Kanazawa, all of Japan

[73] Assignee: Yoji Kajitani, Kanagawa-ken, Japan

[21] Appl. No.: 552,742

[22] Filed: Nov. 3, 1995

[51] Int. Cl.$^6$ .............................. G06F 17/00; G06F 17/50
[52] U.S. Cl. ........................ 364/478.01; 364/491
[58] Field of Search ................ 364/167.01, 468.03, 364/468.09, 468.4, 468.28, 478.02, 488–491, 578, 478.01; 395/921

[56] References Cited

U.S. PATENT DOCUMENTS

| | | | |
|---|---|---|---|
| 5,191,542 | 3/1993 | Murofushi | 364/491 |
| 5,267,176 | 11/1993 | Antreich et al. | 364/491 |
| 5,493,510 | 2/1996 | Shikata | 364/491 |

OTHER PUBLICATIONS

"Bounded–Slicing Structure for Module Placement," Technical Report of IEICE; Shigetoshi Nakatake, et al; pp. 19–24; Oct. 27, 1994.
"A Solution Space of Size (n!)$^2$ For Optimal Rectangle Packings," IEEE Circuits and Systems Society Tokyo Chapter; Murata et al; pp. 109–114; Apr. 20, 1995.

*Primary Examiner*—Reba I. Elmore
*Assistant Examiner*—Steven R. Garland
*Attorney, Agent, or Firm*—Lyon, P.C.

[57] ABSTRACT

Method of placing and extracting raw materials or modules in such a way that a minimum area capable of accommodating the modules can be systematically searched for. The placement of the modules is started with drawing rightwardly upward oblique lines and rightwardly downward oblique lines. The number of the oblique lines of each kind is equal to the number of the modules. The modules are placed at the intersections of the oblique lines such that only one module is placed on each one of the oblique lines. Those modules which are located to the right of an arbitrary module are defined to be located on the right side. In this way, vertical or horizontal positional relations among all the modules are determined. Then, the left sides of those modules which have no other modules on their left sides are placed on a vertical baseline. The lower sides of those modules which have no other modules on their lower sides are placed on a horizontal baseline. The modules other than the modules existing on the vertical baseline are brought close to the left side without overlapping other modules. As a result, the modules are packed in on the left side. Similarly, the modules other than the modules existing on the horizontal baseline are brought close to the lower side without overlapping other modules. As a result, the modules are packed in on the lower side.

6 Claims, 4 Drawing Sheets

Prior Art

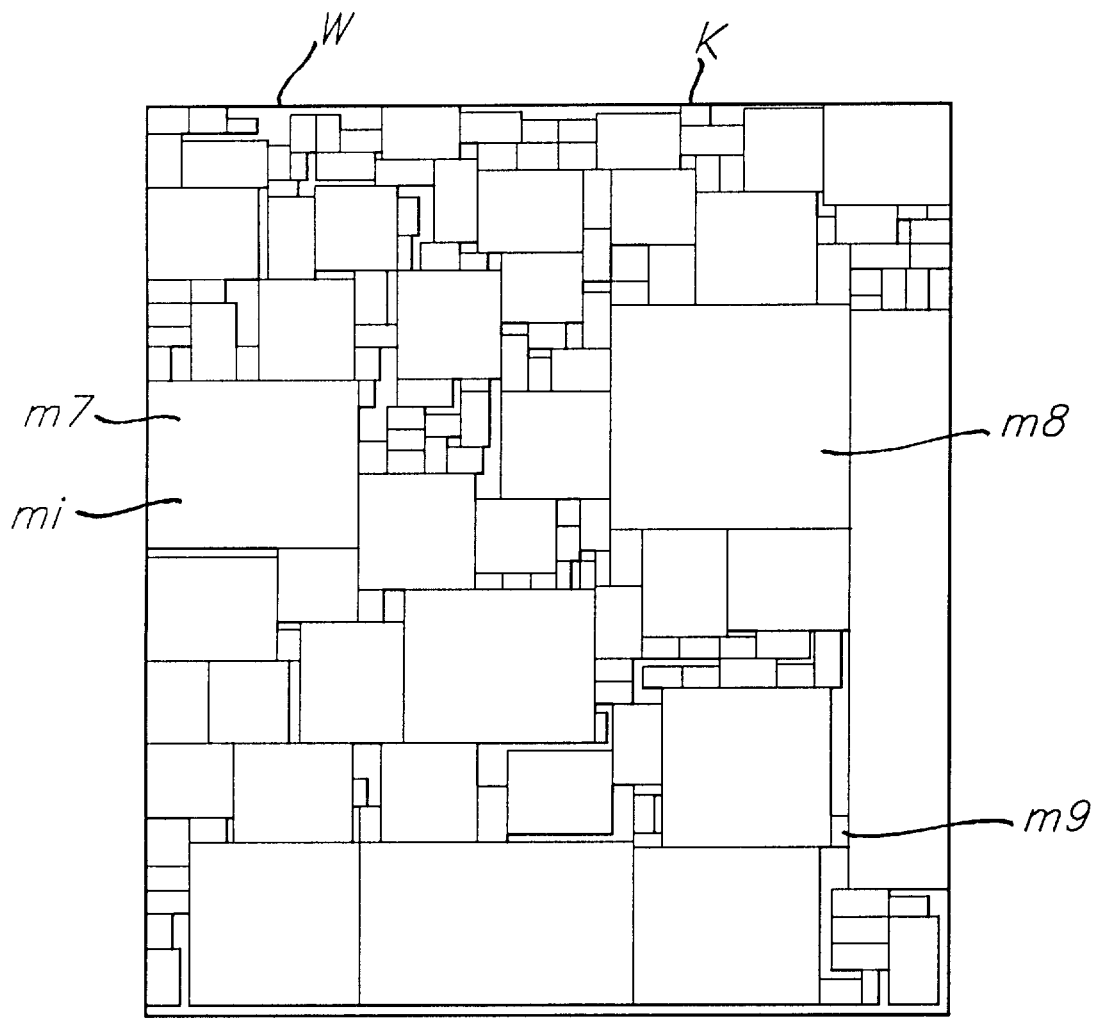
Prior Art
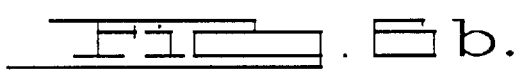

METHOD OF PLACING AND EXTRACTING MODULES

BACKGROUND OF THE INVENTION

1. Field of the Invention

The present invention relates to a method of placing a plurality of modules or raw materials on a base or in a container. The invention also relates to a method of extracting a plurality of modules or raw materials from a base or stock.

2. Description of the Related Art

This kind of method of placing and extracting modules is used in placement and designing of semiconductor integrated circuits and printed-wiring boards and also in a step for extracting a plurality of members of various sizes from a planar stock such as a steel plate or cloth.

Where modules or raw materials are placed or extracted, if the smallest stock can be used, then the cost of production can be lowered, or the performance of the finished product on which modules are arranged or placed can be improved.

The prior art method of deciding placement of modules when they are arranged or extracted is illustrated by referring to FIGS. 6(a) and 6(b). FIG. 6(a) shows the state in which the modules are dispersed. FIG. 6(b) shows the state in which the modules are gathered. In FIG. 6(a), modules mi of various sizes are shown. Assume a rectangular stock K having an area slightly larger than the total area of the modules mi. The outer fringe, or the frame W of the rectangle, of the stock K is drawn as shown in FIG. 6(b). It is necessary that all the modules mi be fitted in the frame W without overlapping each other.

Various methods are available to fit them in the frame as described above. A typical method starts with fitting the greatest module mi into the frame W. Then, the secondly largest module mi is fitted. In this manner, the modules mi are fitted in order of decreasing size. If every module mi is fitted, then no problem will take place. However, if this is not the case, then the arrangement of the modules mi is modified, and they are again fitted. If they are unsuccessfully attempted to be fitted by trial and error, then a slightly larger frame W is prepared, and the process is repeated. In this manner, the minimum frame W in which every module mi can be fitted is searched for.

Referring still to FIG. 6(b), it is assumed that modules m7 and m8 are interchanged in position. When their positions are changed, it is not necessary to greatly modify the positions of the other modules mi, provided that the modules m7 and m8 are substantially identical in size. Accordingly, if a change of the arrangement is repeated, the arrangement variations can be managed. However, if the modules mi such as m7 and m9 which are interchanged in position have considerably different sizes, and if the positions of these modules m7 and m9 are changed, then it is necessary to greatly modify the positions of the other modules mi. Therefore, if a change of the arrangement is repeated, it is difficult to manage the changes of the arrangement of the modules mi. As a result, it is difficult to systematically search for the minimum frame W.

Furthermore, with other proposed methods, it is difficult to systematically search for the minimum frame. In addition, it is necessary to perform an exorbitant amount of calculation.

SUMMARY OF THE INVENTION

The present invention is intended to solve these problems.

It is an object of the present invention to provide a method of placing and extracting raw materials or modules in such a way the minimum area capable of accommodating the modules can be systematically searched for.

It is an additional object of the invention to provide a method of placing and extracting raw materials or modules in such a way that the minimum area capable of accommodating the modules can be searched for with a small amount of calculation.

A method of placing modules in accordance with the present invention achieves the above-described objects and is intended to place a plurality of substantially rectangular modules (a–h) of arbitrary sizes. This method comprises the following first through twelfth steps:

1) In the first step, rightwardly upward oblique lines (k) which are as many as said modules (M) and do not intersect with each other are drawn.

2) In the second step, rightwardly downward oblique lines (n) which are as many as said modules and do not intersect with each other are drawn. Thus, the oblique lines (n) intersect with the oblique lines (k) at intersections.

3) In the third step, the modules are placed at the intersections of the oblique lines (n) and the oblique lines (k) such that one module is located on each one oblique line.

4) In the fourth step, an arbitrary module is located on a first one of the rightwardly downward oblique lines and on a first one of the rightwardly upward oblique lines. Some modules (hereinafter referred to as the second modules) are located to the right of this first rightwardly downward oblique line and to the right of this first rightwardly upward oblique line. The second modules are defined to be placed to the right of the arbitrary module.

5) In the fifth step, some modules (hereinafter referred to as the third modules) are located to the left of the first rightwardly downward oblique line on which the aforementioned arbitrary module is located and to the left of the first rightwardly upward oblique line on which this arbitrary module is located. The third modules are defined to be placed over the arbitrary module.

6) In the sixth step, some modules (hereinafter referred to as the fourth modules) are located over the first rightwardly downward oblique line on which the arbitrary module is located and over the first rightwardly upward oblique line on which the arbitrary module is located. The fourth modules are defined to be placed over the arbitrary module.

7) In the seventh step, some modules (hereinafter referred to as the fifth modules) are located under the first rightwardly downward oblique line on which the arbitrary module is located and under the first rightwardly upward oblique line on which the arbitrary module is located. The fifth modules are defined to be placed under the arbitrary module.

8) In the eighth step, the fourth through seventh steps are repeated for other modules to determine over-under or left-right positional relations among all the modules.

9) In the ninth step, a left side or right side is taken as a vertical baseline. Some modules have no other modules on the side of the vertical baseline. Sides of these modules are placed on the vertical baseline (P).

10) In the tenth step, an upper or lower side is defined as a horizontal baseline. Some modules have no other modules on the side of the horizontal baseline (T). Sides of these modules are placed on the horizontal baseline (T).

11) In the eleventh step, the modules other than the modules located on the vertical baseline are brought close to the vertical baseline without overlapping other modules within definitions given by the steps 4) and 5) above, whereby the modules are packed in on a side of the vertical baseline.

12) In the twelfth step, the modules other than the modules located on the horizontal baseline are brought close to the horizontal baseline without overlapping other modules within definitions given by the steps 6) and 7) above, whereby the modules are packed in on a side of the horizontal baseline.

Sometimes, the arrangement of the modules created in the third step is modified, and then the fourth through twelfth steps are repeated.

Sometimes, said modules are plural in number. Some of the modules may be replaced with rectangular spaces (S) of arbitrary sizes, and then the first through twelfth steps are carried out in the same way as the foregoing.

In one aspect of the invention, instead of the modules, module extraction patterns are placed. Modules are extracted according to these extraction patterns.

Other objects and features of the invention will appear in the course of the description thereof, which follows.

BRIEF DESCRIPTION OF THE DRAWINGS

FIG. 6(b) is a diagram similar to FIG. 6(a), but in which the modules have been collected.

DETAILED DESCRIPTION OF THE PREFERRED EMBODIMENTS

Figure 1:
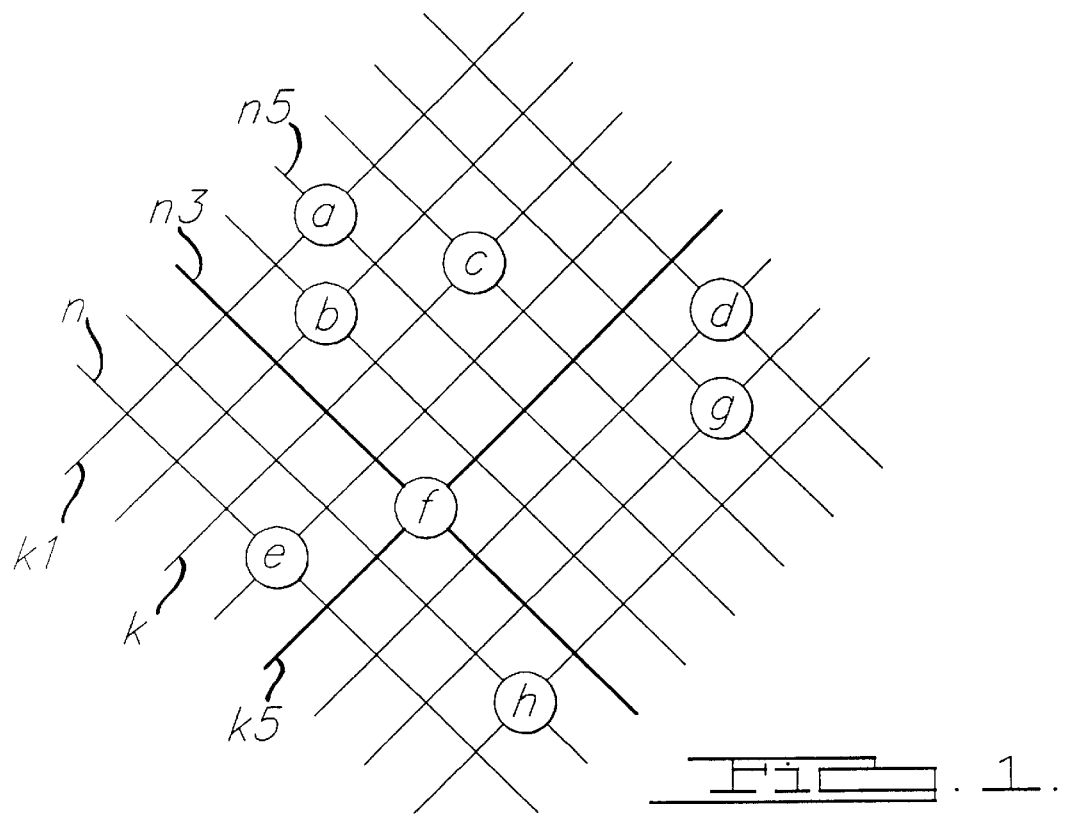
FIG. 1 is a diagram illustrating a geometrical figure used for determination of an arrangement which is used for placement and extraction of modules according to the present invention.
Figure 2:
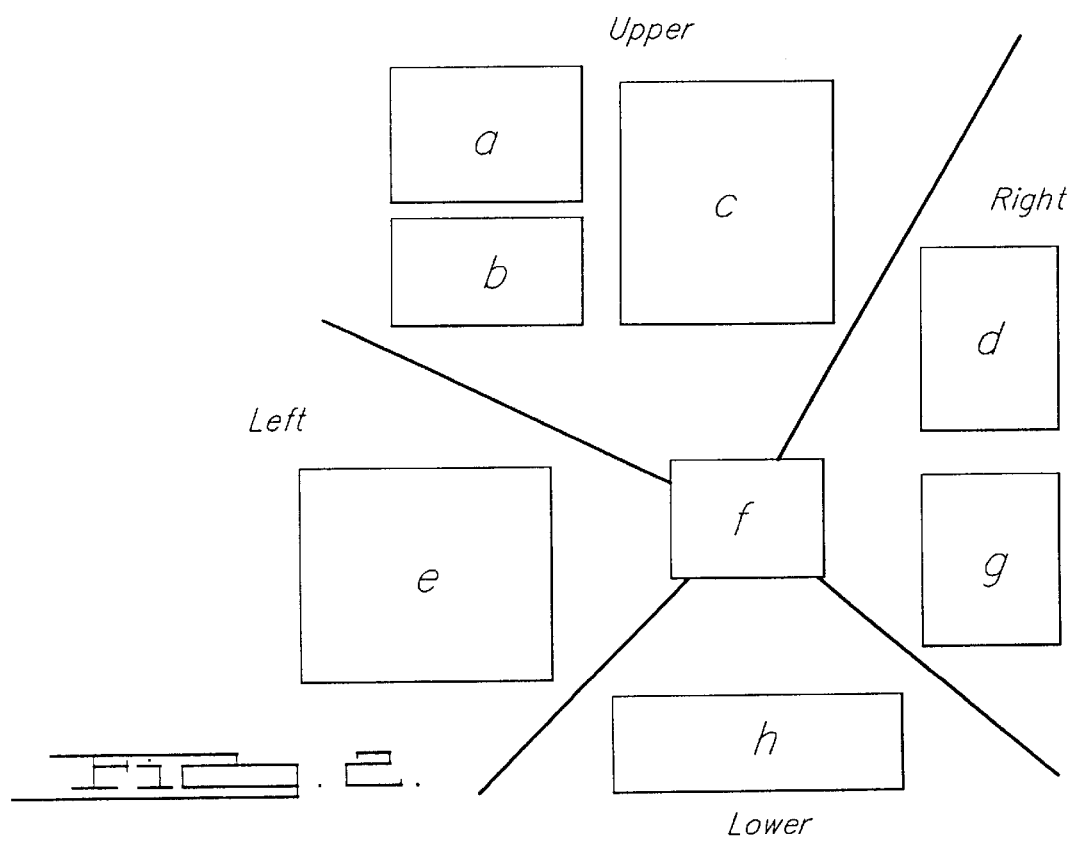
FIG. 2 is a diagram illustrating the state in which modules have been arranged according to the geometrical figure shown in FIG. 1.
Figure 3:
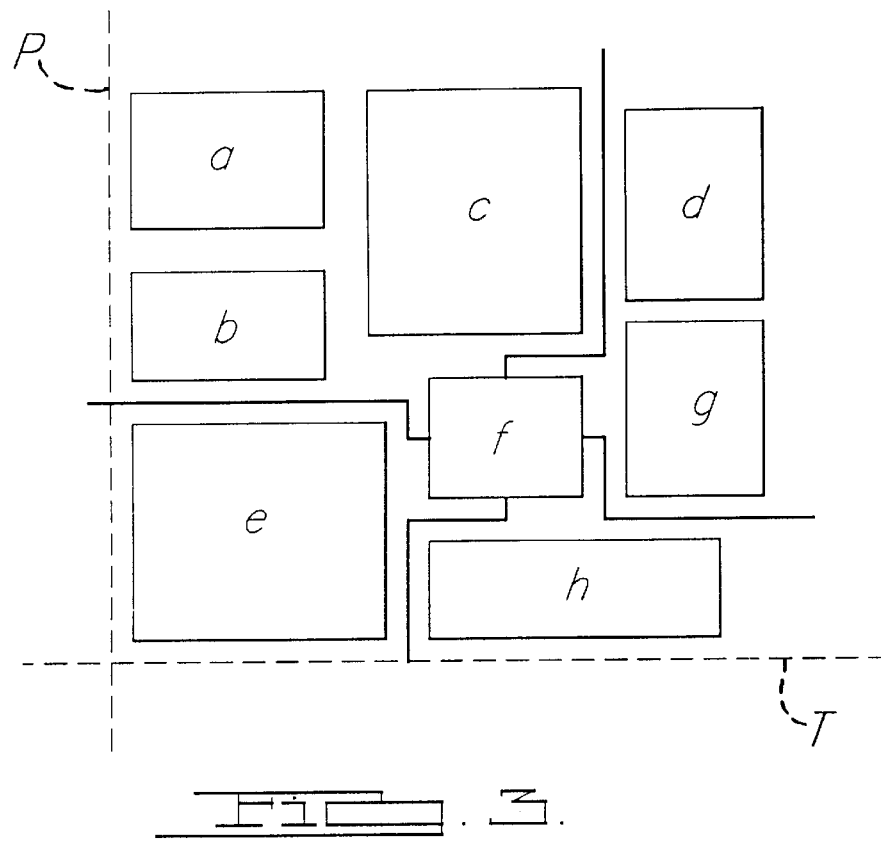
FIG. 3 is a diagram similar to FIG. 2, but in which the modules are being collected.
Figure 4:
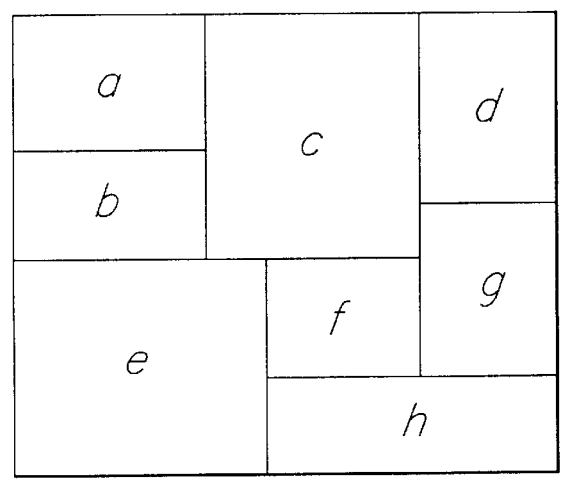
FIG. 4 is a diagram similar to FIG. 2, but in which the modules have been collected.

A method of placing and extracting raw materials or modules in accordance with the present invention is described by referring to FIGS. 1–4. FIG. 1 illustrates a geometrical figure used for the novel method of placing and extracting modules. FIG. 2 illustrates the state in which the modules have been arranged according to the geometrical figure shown in FIG. 1. FIG. 3 illustrates the state in which the modules are being collected. FIG. 4 illustrates the state in which the modules have been collected.

A plurality of rectangular modules a–h of arbitrary sizes are arranged on a substantially rectangular substrate. For this purpose, a geometrical figure for determining the arrangement is drawn as shown in FIG. 1.

In FIG. 1, the number M of these modules a–h is eight. The first step consists of drawing rightwardly upward oblique lines k as many as the number M (eight) of the modules. The oblique lines k are inclined at an angle of 45°. The second step consists of drawing rightwardly downward oblique lines n intersecting with the rightwardly upward oblique lines k. The oblique lines n are also inclined at an angle of −45°. The number of the oblique lines n is the same, i.e., eight. As a result, the rightwardly upward oblique lines k and the rightwardly downward oblique lines n form 8×8 (i.e., 64) intersections.

The third step consists of placing the modules at the intersections such that one module is placed on each one of the rightwardly upward oblique lines k and the rightwardly downward oblique lines n. In FIG. 1, a module a is located at the intersection (1,5) of the leftmost rightwardly upward oblique line k1 and the fifthly leftmost rightwardly downward oblique line n5. Any other modules are not located on the leftmost rightwardly upward oblique line k1 or on the fifthly leftmost rightwardly downward oblique line n5. In this way, all the modules a–h are arranged. This arrangement may be done at will. It is possible to estimate an arrangement permitting the modules to be placed in the minimum area. Furthermore, it is possible to arrange them by a computer, using a table of random numbers.

After arranging all the modules a–h in this way, the vertical and horizontal positional relations among the modules are determined, using the geometrical figure described above. The method of determination is described below concerning the module f.

This module f is located at the intersection (5,3) of the rightwardly upward oblique line k5 and the rightwardly downward oblique line n3. The two-dimensional space is vertically and horizontally divided into four domains by the rightwardly upward oblique line k5 and the rightwardly downward oblique line n3.

The other modules d and g which are located to the right are defined to be positioned to the right of the module f (fourth step).

Similarly, other module e which is located to the left is defined to be positioned to the left of the module f (fifth step).

Likewise, other modules a, b, and c which are on the upper side are defined to be positioned over the module f (sixth step).

Similarly, other module h which is on the lower side is defined to be positioned under the module f (seventh step).

By these operations, the vertical and horizontal positional relations of the arbitrary module f to the other modules are defined. This series of operations is repeated for every other modules until the vertical and horizontal relations among all the modules are determined (eighth step). In particular, if the number of the modules is M, this series of operations is required to be carried out for (M−1) modules. If this series of operations is complete, positional relations as shown in FIG. 2 are obtained.

Referring next to FIG. 3, either the left side or the right side is defined as the vertical baseline. For example, the left side is taken as the vertical baseline. The left sides of the modules a, b, and e which have no modules on their left sides are located on the vertical baseline P (ninth step).

Similarly, either the upper side or the lower side is defined as the horizontal baseline. For instance, the lower side is defined as the horizontal baseline. The lower sides of the modules e and h which have no other modules on their lower sides are located on the horizontal baseline T (tenth step).

Then, the modules other than the modules a, b, and e are brought close to the vertical baseline P, i.e., the left side, without overlapping other modules under the definitions given by the fourth and fifth steps described above, whereby the modules are packed in on a side of the vertical baseline (eleventh step).

Then, the modules other than the modules e and h located on the horizontal baseline T are brought close to the horizontal baseline T, i.e., to the lower side, without overlapping other modules under the definitions given by the sixth and seventh steps described above, whereby the modules are packed in on a side of the horizontal baseline T (twelfth step).

When the modules a–h are collected in this way, the modules a–h are collected as shown in FIG. 4. The size sufficient to place the modules a–h is found. If a base or container larger than the found size is prepared, then the modules can be placed on the base or in the container, or the modules can be extracted from the base (thirteenth step). When the modules are extracted, patterns according to which the modules are extracted are placed instead of the modules.

If this size is not satisfactory, and if one wants to reduce the size of the modules further, then the arrangement of the modules shown in FIG. 1 is modified. When a base of satisfactory size is obtained, the operation is ended. Of course, every arrangement can be discussed. Modifications of the arrangement can be made at random. It is also possible to compare an arrangement obtained after a modification with an arrangement obtained before the modification and to estimate an improved arrangement.

Sometimes, the base K does not take a rectangular form but its outer periphery is preferably notched so that the base K is provided with spaces S into which screws are inserted, or that the base is loaded into a case for a videotape recorder. In these cases, it is necessary to arrange the spaces S in the central portion or peripheral portions of the base K.

Figure 5:
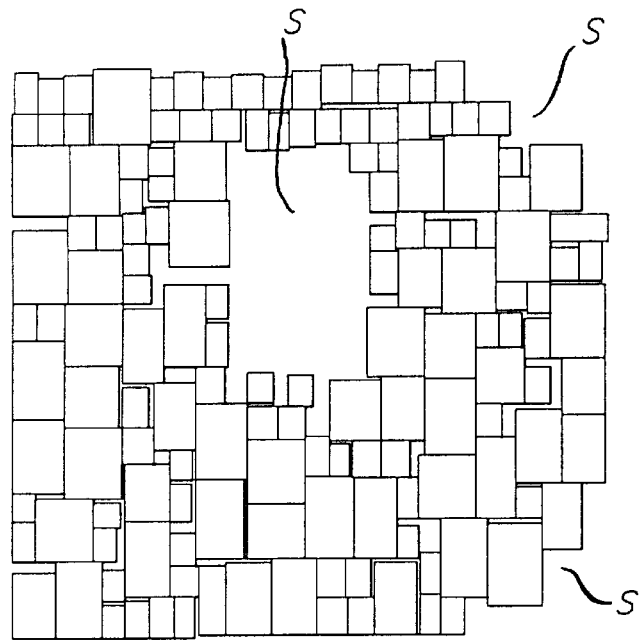
FIG. 5 is a diagram illustrating arrangement of modules when spaces are also arranged.
Figure 5:
Figure 6A:
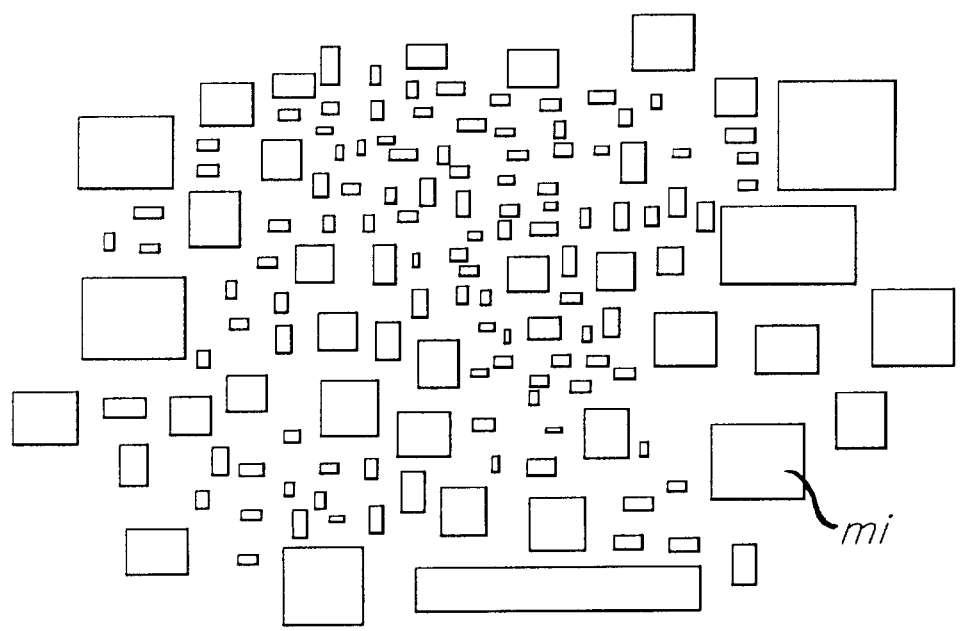
FIG. 6(a) is a diagram illustrating a method of deciding arrangement of modules, and in which the modules are dispersed.
Figure 6A:

Accordingly, empty rooms where rectangular spaces S are present and the spaces where the rectangular modules a–h are present are treated alike. Instead of the modules a–h, one or more spaces S are placed at one or more intersections in the geometrical figure used for determination of the arrangement. In the same way as in the case of the modules a–h, the fourth through twelfth steps are carried out. As a result, an arrangement resembling the letter "D" as shown in FIG. 5 can be obtained.

While one embodiment of the present invention has been described in detail, the scope of the invention is not limited thereto. Rather, various modifications and changes are possible within the scope of the invention delineated by the accompanying claims. Examples of the modifications are given below.

(1) In the above embodiment, the number M of the modules a–h is eight. of course, this number M can be varied. For example, it can be 4 or 36.

(2) In the above embodiment, the senses of the modules are not changed. It is also possible to vary the senses of the modules. That is, each module may be directed vertically or horizontally.

(3) In the above embodiment, the rightwardly upward oblique lines k are shown to be tilted at an angle of 45°. The tilt angle can be varied appropriately if the rightwardly upward oblique lines k do not intersect with each other and if they go upwardly rightwardly. For instance, rightwardly upward oblique lines k tilted at an angle of 35° can be drawn. Similarly, the tilt angle of the rightwardly downward oblique lines n can be varied adequately.

(4) No limitations are imposed on the modules or on the base. However, optimum examples include placement and designing of semiconductor integrated circuits and printed-wiring boards where circuit elements are modules and circuit boards are bases.

Furthermore, the invention is adapted for the case in which articles forming modules are loaded into a container. Moreover, the invention is adapted for the case in which a plurality of modules or raw materials of various sizes are extracted from a planar base such as cloth or steel plate.

(5) It is not necessary to actually form the geometrical figure on paper or the like, the figure being used for determination of placement. The geometrical figure may be formed in a virtual space created by a computer or the like.

(6) The steps are not always required to be performed in the order described above. For example, the first and second steps can be interchanged in order. Also, the fourth through seventh steps can be interchanged in order. Furthermore, these steps may be carried out simultaneously.

(7) In the above embodiment, the modules are rectangular in shape. If the spaces secured to place the modules are rectangular in shape, the modules themselves are not always required to be rectangular.

In the present invention, modules are placed at the intersections of rightwardly upward oblique lines and rightwardly downward oblique lines. The positional relations among the modules are determined, and then the modules are gathered according to the positional relations. Accordingly, the operation consists only of placing the modules in such a way that they are packed in according to the determined positional relations. In consequence, the work for placing the modules, including calculations necessary for the arrangement, can be carried out easily.

If the obtained arrangement is not satisfactory, satisfactory results will be obtained only by varying the intersections at which the modules are placed. Since the number of the intersections is only the square of the number M of the modules, i.e., $M^2$, it is easy to manage the arrangement of the modules. The modules can be rearranged systematically.

Moreover, some modules are replaced by rectangular spaces of arbitrary sizes and so spaces can be formed around or inside the arranged modules. Consequently, spaces or notches for mounting with screws can be formed in the base on which the modules are arranged.

When patterns according to which the modules are extracted are placed instead of the modules, they can be extracted according to these patterns.

What is claimed is:

1. A method of placing a plurality of substantially rectangular modules of arbitrary sizes, said method comprising the steps of:

drawing rightwardly upward oblique lines which do not intersect with each other on a base, said rightwardly upward oblique lines being equal in number with said modules (first step);

drawing rightwardly downward oblique lines on the base which do not intersect with each other but intersect with said rightwardly upward oblique lines, said rightwardly downward oblique lines being equal in number with said modules (second step);

placing said modules at said intersections such that only one module is located on each one of said oblique lines (third step);

taking an arbitrary one of said modules to be located on a first one of said rightwardly downward oblique lines and on a first one of said rightwardly upward oblique lines;

taking second ones of said modules to be located on a right side of said first rightwardly downward oblique line and located on a right side of said first rightwardly upward oblique line;

defining said second modules to be located on a right side of said arbitrary module (fourth step);

taking third ones of said modules to be located on a left side of said first rightwardly downward oblique line and located on a left side of said first rightwardly upward oblique line;

defining said third modules to be located on a left side of said arbitrary module (fifth step);

taking fourth ones of said modules to be located over said first rightwardly downward oblique line and located over said first rightwardly upward oblique line;

defining said fourth modules to be located over said arbitrary module (sixth step);

taking fifth ones of said modules to be located under said first rightwardly downward oblique line and located under said first rightwardly upward oblique line;

defining said fifth modules to be located under said arbitrary module (seventh step);

repeating the fourth through seventh steps for others of said modules to determine vertical or horizontal positional relations among all the modules (eighth step);

establishing a vertical baseline either on the left or on the right of all of said modules;

taking some of said modules not having other modules on a side of said vertical baseline as sixth modules;

placing sides of said sixth modules on said vertical baseline (ninth step);

establishing a horizontal baseline either above or below all of said modules;

taking some of said modules not having other modules on a side of said horizontal baseline as seventh modules;

placing sides of said seventh modules on said horizontal baseline (tenth step);

bringing the modules other than the modules located on the vertical baseline close to the vertical baseline without overlapping other modules under definitions given by the fourth and fifth steps, whereby the modules are packed in on a side of said vertical baseline (eleventh step); and bringing the modules other than the modules located on the horizontal baseline close to the horizontal baseline without overlapping other modules under definitions given by the sixth and seventh steps, whereby the modules are packed in on a side of said horizontal baseline (twelfth step).

2. The method of claim 1, wherein said modules placed in said third step are rearranged, and wherein said fourth through twelfth steps are repeated.

3. A method of extracting a plurality of substantially rectangular modules of arbitrary sizes, said method comprising the steps of:

drawing rightwardly upward oblique lines which do not intersect with each other on a base, said rightwardly upward oblique lines being equal in number with said extracted modules (first step);

drawing rightwardly downward oblique lines on said base which do not intersect with each other but intersect with said rightwardly upward oblique lines, said rightwardly downward oblique lines being equal in number with said extracted modules (second step);

placing module extraction patterns at said intersections such that only one module extraction pattern is located on each one of said oblique lines (third step);

taking an arbitrary one of said patterns to be located on a first one of said rightwardly downward oblique lines and on a first one of said rightwardly upward oblique lines;

taking second ones of said patterns to be located on a right side of said first rightwardly downward oblique line and located on a right side of said first rightwardly upward oblique line;

defining said second patterns to be located on a right side of said arbitrary pattern (fourth step);

taking third ones of said patterns to be located on a left side of said first rightwardly downward oblique line and located on a left side of said first rightwardly upward oblique line;

defining said third patterns to be located on a left side of said arbitrary pattern (fifth step);

taking fourth ones of said patterns to be located over said first rightwardly downward oblique line and over said first rightwardly upward oblique line;

defining said fourth patterns to be located over said arbitrary pattern (sixth step);

taking fifth ones of said patterns to be located under said first rightwardly downward oblique line and under said first rightwardly upward oblique line;

defining said fifth patterns to be located under said arbitrary pattern (seventh step);

repeating the fourth through seventh step for others of said patterns to determine vertical or horizontal positional relations among all the modules (eighth step);

establishing a vertical baseline either on the left or on the right of all of said patterns;

taking some of said spaces not having other spaces on a side of said vertical baseline as sixth patterns;

placing sides of said sixth patterns on said vertical baseline (ninth step);

establishing a horizontal baseline either above or below all of said patterns;

taking some of said patterns not having other spaces on a side of said horizontal baseline as seventh patterns;

placing sides of said seventh patterns on said horizontal baseline (tenth step);

bringing the patterns other than the patterns located on the vertical baseline close to the vertical baseline without overlapping other patterns under definitions given by the fourth and fifth steps, whereby the patterns are packed in on a side of said vertical baseline (eleventh step);

bringing the patterns other than the patterns located on the horizontal baseline close to the horizontal baseline without overlapping other patterns under definitions given by the sixth and seventh steps, whereby the patterns are packed in on a side of said horizontal baseline (twelfth step); and extracting modules according to module extraction patterns arranged in the eleventh and twelfth steps (thirteenth step).

4. The method of claim 3, wherein said module extraction patterns placed in said third step are rearranged, and wherein said fourth through twelfth steps are repeated.

5. A method of placing a plurality of substantially rectangular modules of arbitrary sizes on a base wherein the modules are placed around voids of predetermined size, shape, and location, said method comprising the steps of:

drawing rightwardly upward oblique lines which do not intersect with each other on said base, said rightwardly upward oblique lines being equal in number with said modules (first step);

drawing rightwardly downward oblique lines on said base, which do not intersect with each other but intersect with said rightwardly upward oblique lines, said rightwardly downward oblique lines being equal in number with said modules (second step);

placing said modules at said intersections such that only one module is located on each one of said oblique lines and no module overlaps any of said voids (third step);

taking an arbitrary one of said modules to be located on a first one of said rightwardly downward oblique lines and on a first one of said rightwardly upward oblique lines;

taking second ones of said modules to be located on a right side of said first rightwardly downward oblique line and located on a right side of said first rightwardly upward oblique line;

defining said second modules to be located on a right side of said arbitrary module (fourth step);

taking third ones of said modules to be located on a left side of said first rightwardly downward oblique line and located on a left side of said first rightwardly upward oblique line;

defining said third modules to be located on a left side of said arbitrary module (fifth step);

taking fourth ones of said modules to be located over said first rightwardly downward oblique line and located over said first rightwardly upward oblique line;

defining said fourth modules to be located over said arbitrary module (sixth step);

taking fifth ones of said modules to be located under said first rightwardly downward oblique line and located under said first rightwardly upward oblique line;

defining said fifth modules to be located under said arbitrary module (seventh step);

repeating the fourth through seventh steps for others of said modules to determine vertical or horizontal positional relations among all the modules (eighth step);

establishing a vertical baseline either on the left or on the right of all of said modules;

taking some of said modules not having other modules on a side of said vertical baseline as sixth modules;

placing sides of said sixth modules on said vertical baseline (ninth step);

establishing a horizontal baseline either above or below all of said modules;

taking some of said modules not having other modules on a side of said horizontal baseline as seventh modules;

placing sides of said seventh modules on said horizontal baseline (tenth step);

bringing the modules other than the modules located on the vertical baseline close to the vertical baseline without overlapping any voids or other modules under definitions given by the fourth and fifth steps, whereby the modules are packed in on a side of said vertical baseline (eleventh step); and bringing the modules other than the modules located on the horizontal baseline close to the horizontal baseline without overlapping any voids or other modules under definitions given by the sixth and seventh steps, whereby the modules are packed in on a side of said horizontal baseline (twelfth step).

6. The method of claim 5, wherein said modules placed in said third step are rearranged, and wherein said fourth through twelfth steps are repeated.

* * * * *